United States Patent
Belville et al.

(10) Patent No.: US 9,317,640 B2
(45) Date of Patent: Apr. 19, 2016

(54) SYSTEM AND METHOD FOR THE ELECTRONIC DESIGN OF COLLABORATIVE AND VALIDATED ARCHITECTURES

(75) Inventors: Daniel R. Belville, Swartz Creek, MI (US); Michael K. Carter, Layton, UT (US); Robin R. Petrowski, Davison, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2469 days.

(21) Appl. No.: 12/122,425

(22) Filed: May 16, 2008

(65) Prior Publication Data

US 2009/0287635 A1    Nov. 19, 2009

(51) Int. Cl.
*G06F 17/50*       (2006.01)

(52) U.S. Cl.
CPC ........ *G06F 17/5045* (2013.01); *G06F 2217/04* (2013.01)

(58) Field of Classification Search
CPC .................................................. G06F 17/5054
USPC ................... 715/764, 747; 716/119, 102, 110
See application file for complete search history.

(56) References Cited

U.S. PATENT DOCUMENTS

| | | | |
|---|---|---|---|
| 5,767,848 A * | 6/1998 | Matsuzaki et al. | 715/751 |
| 5,826,265 A * | 10/1998 | Van Huben et al. | |
| 6,917,909 B1 | 7/2005 | Markov et al. | 703/14 |
| 7,076,417 B2 | 7/2006 | Jain et al. | 703/20 |
| 7,546,571 B2 * | 6/2009 | Mankin et al. | 716/137 |
| 2007/0260436 A1 * | 11/2007 | Couretas et al. | 703/6 |

OTHER PUBLICATIONS

Troux technologies, "Troux Transformation Platform™ Unlocks the Full Power of Enterprise Architecture," 2 pages.

* cited by examiner

*Primary Examiner* — William Bashore
*Assistant Examiner* — Jeanette J Parker
(74) *Attorney, Agent, or Firm* — Hewlett Packard Enterprise Patent Department

(57) ABSTRACT

One aspect of the invention is a method for the electronic design of collaborative and validated architectures. The method for the electronic design of an architecture includes storing architecture elements created by users in a centralized database. The creation of an architecture model is initiated in response to a request of a user of a client system. The centralized database is accessed to retrieve the architecture elements and a selection of an architecture element for inclusion in the architecture model is received from the user. The architecture model including the selected architecture element is included in the centralized database.

36 Claims, 2 Drawing Sheets

SYSTEM AND METHOD FOR THE ELECTRONIC DESIGN OF COLLABORATIVE AND VALIDATED ARCHITECTURES

TECHNICAL FIELD OF THE INVENTION

This invention relates generally to electronic design and more particularly to a system and method for the electronic design of collaborative and validated architectures.

BACKGROUND OF THE INVENTION

Electronic drawing tools have been introduced to assist designers in electronic architecture creation. These solutions include drawing and synthesis tools that allow designers to specify and optimize designs at a logic level. However, existing design tools do not provide for the validation of architectures. The tools do not automatically enforce technology policies and layout and naming standards. The tools do not provide automated linkage to and validation against business requirements and other project deliverables. Additionally, existing tools do not allow for efficient and reliable reuse of created architectures and architectural components. Reuse, if it is allowed at all, only occurs when a designer copies and pastes select portions of some architecture drawing into a new architecture. As a result of these shortcomings, designers must either know and understand all of the technical details for each architectural component. This process is inefficient and error prone. Further, because existing tools do not provide for validation and reuse capability, it is difficult to reliably develop architectures in a distributed and collaborative environment.

SUMMARY OF THE INVENTION

One aspect of the invention is a method for the electronic design of collaborative and validated architectures. The method for the electronic design of an architecture includes storing architecture elements created by users in a centralized database. The creation of an architecture model is initiated in response to a request of a user of a client system. The centralized database is accessed to retrieve the architecture elements and a selection of an architecture element for inclusion in the architecture model is received from the user. The architecture model including the selected architecture element is included in the centralized database.

The invention has several important technical advantages. Various embodiments of the invention may have none, one, some, or all of these advantages without departing from the scope of the invention. In particular embodiments, a system architecture and method are provided that results in the centralized and automated storage of architectures and architecture components for validation and reuse.

In a particular embodiment, the system and method may enable architects to create reusable components. The system and method also allow architects to reuse existing components. In a particular embodiment, such a system may enforce architecture standards, as defined in templates and the hardware/software components, that are used to build the physical architectures. A standardized system ensures that only policy-approved architecture elements are used. A standardized system may enforce consistent labels, layouts, taxonomy, and definitions. The system and method may enable designers to select from pre-defined platforms and design system architectures without knowledge of the details of the underlying physical implementations and platforms.

In particular embodiments, a system architecture and method are provided that enable multiple architects to collaboratively develop architectures. The system and method may enable reuse of modular architectures and architecture components in a collaborative environment. Thus, such a system may reduce development time and cost and result in more robust architectures.

In a particular embodiment, the system and method may result in the validation of an architecture model. For example, a stored architecture model may be validated against product lists mandated by a technology policy. Additionally or alternatively, the system may present elements to a user for inclusion in the architecture model. However, where a technology policy or business rule is applicable, only those elements that comply with the technology policy or the business rule may be presented to the user. In a particular embodiment, such a system and method may reduce maintenance or architecture models and reduce errors and the amount of rework required. Further, higher quality architectures may be created.

Other advantages may include the creation of linkages between an architecture model and that model's design requirements. For example, a linkage may be created between the architecture model and any business requirements or technology policies to which the architecture model is subject. Additionally or alternatively, linkages may be created between an architecture and its release,

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1-4 of the drawings, like numerals being used for like and corresponding parts of the various drawings.

The systems and methods of FIGS. 1-4 provide for a architecture design environment that utilizes consistent tools and consistent data to enable collaboration amongst designers and to improve the efficiency of electronic design. Architecture systems and components are maintained in a centralized repository making it possible for designers to draw from the same set of data and create designs that eliminate invalid and inconsistent components. Architectures may be stored both as component parts and as whole architectures. As a result, whole systems and component parts are available for use by designers.

Figure 1:
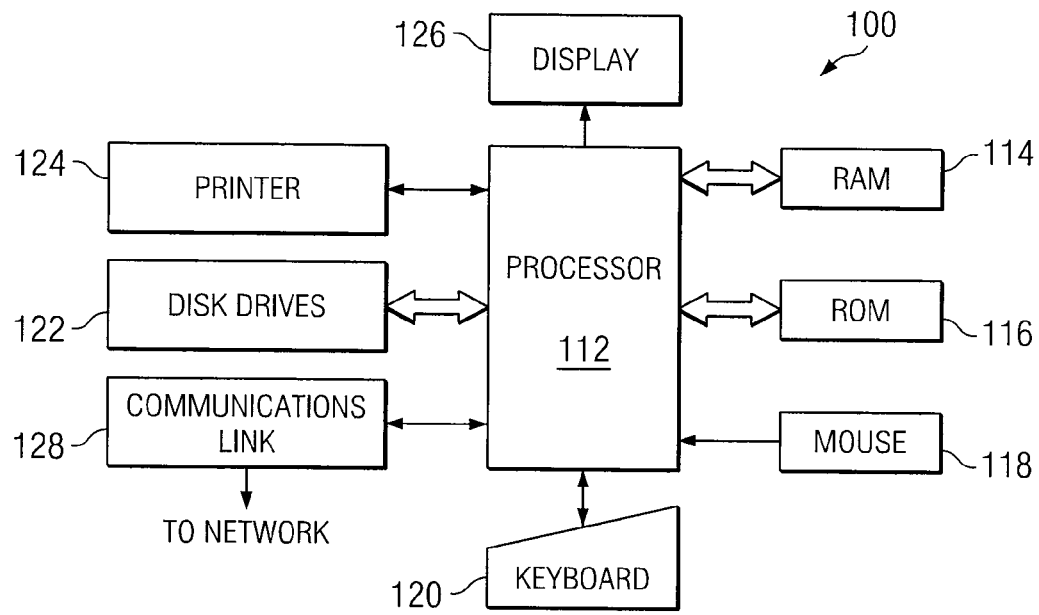
FIG. 1 illustrates a block diagram of a general purpose computer that may be used in accordance with the present invention.

FIG. 1 illustrates a general purpose computer 100 that may be used for the electronic design of collaborative and validated architectures, in accordance with the present invention.

In certain embodiments, general purpose computer 100 may comprise a computer that enables architects to collaboratively develop architectures, create reusable components, and reuse existing components. General purpose computer 100 may enforce architecture standards to ensure the correct use of only policy-approved architecture elements. General purpose computer 100 may provide validation against product lists maintained by a technology policy. General purpose computer 100 may enforce consistent labels, layouts, taxonomy, and definitions based on common architecture templates. Accordingly, in particular embodiments and as will be described in more detail below, general purpose computer 100 may enable designers to select from pre-defined platforms and design system architectures from a "catalog" without knowledge of the details of the underlying physical implementations and platforms.

General purpose computer 100 may be adapted to execute any of the well known MS-DOS, PC-DOS, OS2, UNIX, MAC-OS and Windows operating systems or other operating systems. As used in this document, operating system may refer to the local operating system for computer 100, a network operating system, or a combination of both. General purpose computer 100 comprises processor 112, random access memory (RAM) 114, read only memory (ROM) 116, mouse 118, keyboard 120, and input/output devices such as printer 124, disk drives 122, display 126, and communications link 128. The present invention includes programs that may be stored in RAM 114, ROM 116, or disk drives 122 and may be executed by processor 112. Communications link 128 is connected to a computer network but could be connected to a telephone line, an antenna, a gateway, or any other type of communication link. Disk drive 122 may include a variety of types of storage media such as, for example, floppy disk drives, hard disk drives, CD ROM drives, or magnetic tape drives. Disk drive 122 may also include a network disk housed in a server within the private network. Although this embodiment employs a plurality of disk drives 122, a single disk drive 122 could be used without departing from the scope of the invention.

As illustrated, FIG. 1 only provides one example of a computer that may be used with the invention. The invention could be used with computers other than general purpose computers as well as general purpose computers without conventional operating systems.

Figure 2:
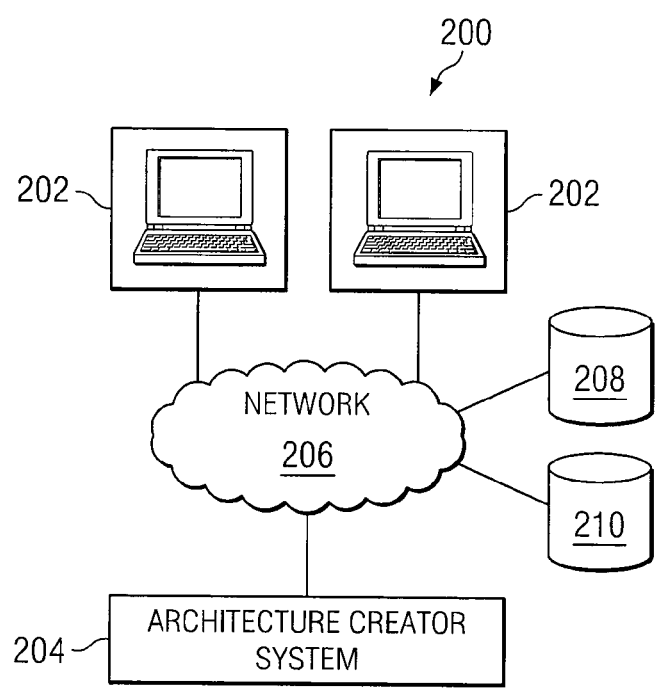
FIG. 2 illustrates a block diagram of an example system that may be used for the electronic design of collaborative and validated architectures in accordance with the present invention.

FIG. 2 illustrates a block diagram of an example system 200 that may be used for the electronic design of collaborative and validated architectures in accordance with the present invention. Specifically, one or more client systems 202 are connected to an architecture creator system 204 via a network 206. Architecture creator system 204 is used by client systems 202 to create architectures that include various combinations of architectural elements. Once created, the architectures and architectural elements are stored in a centralized repository 208 and may be used and reused by users of client systems 202.

In particular embodiments, clients 202 may be configured substantially like computer 100 described above with regard to FIG. 1. Alternatively, clients 202 may include any general purpose computer with the appropriate applications and functionality for the electronic design of collaborative and validated architectures. Any number of client systems 202 may be included in system 200.

Client systems 202 communicate with architecture creator system 204 via network 206. Network 206 represents communication equipment, including hardware and any appropriate controlling logic, for interconnecting client systems 202 and architecture creator system 204. In certain embodiments, network 206 may comprise all or a portion of a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate the described communication capabilities, communication network 206 may include routers, hubs, switches, gateways, call controllers, and/or any other suitable components in any suitable form or arrangement. Although communication network 206 is illustrated as a single network, communication network 206 may comprise any number or configuration of networks.

Architecture creator system 204, which is described in more detail below with regard to FIG. 2, includes the hardware and software required to create architectures that include various combinations of architectural elements. Reference architectures that are created may include business, process, logical, and physical views. Reference architectures that are used and/or created by architecture creator system 204 are stored in a centralized repository 208. Centralized repository 208 makes it possible for users of clients 202 to draw from a common set of data and create designs that are consistent and reusable. Centralized repository 208 is a multi-user database that can support simultaneous data retrieval and storage for multiple users of architecture creator system 204.

In particular embodiments, centralized repository 208 includes a relational database or other data store that contains all or a portion of the reference data necessary to support the construction of architecture components. The architectures are stored in centralized repository 208 as wholes and as component elements such that both are available to designers for reuse. In particular embodiments, an architecture element may include any data element that can be input into the architecture creator system 204. Architecture elements may be the lowest level of granularity in an architecture model. An architecture model is a grouping of architecture elements that relate to one another for a particular purpose or function. Centralized repository 208 stores both architecture elements and architecture models.

In particular embodiments, an architecture stack may be created and stored in centralized repository 208. An architecture stack is a pre-determined and approved grouping of architecture elements. The stack may include all views of an architecture, such as process views, logical views, and physical views, and may include elements from different views. An architecture stack is treated as a single reusable component. Each architecture element in a stack has an implicit dependence to at least one other architecture element in the stack. Although an architecture stack may include any combination of architecture elements, an architecture stack may also include embedded stacks. Thus, a single architecture stack may include multiple sub-grouping of pre-determined and approved architecture elements.

In particular embodiments, centralized repository 208 may store both production stacks and draft stacks. While a production stack is a pre-determined and approved grouping of architecture elements, such as that described above, a draft stack includes a grouping of architecture elements that has not been approved or validated. Draft stacks may be appropriately identified as such to prevent reuse by users of clients 202 when only approved and validated architecture components and stacks may be used in a project.

Centralized repository 208 may be populated with the architecture stacks and other reference data as such data is created or on a periodic basis. Once published to the centralized repository, an architecture stack is an actual reference architecture item that may serve as a future reference item. Architecture creator system 204 makes the data available for reuse by users of clients 202.

Although the reference data that is used to create architecture models is available for subsequent reuse, the original reference data created by architects and used to initially populate centralized repository 208 is not disturbed. As such, the reference data itself is not used directly in the architectures subsequently created by users of clients 202. Rather, architecture creator system 204 creates a mirror copy of an accessed reference element and allows the user to place the mirror copy into an in-progress project. An identifier may be assigned to the minor copy to distinguish the mirror copy from the original reference component. In particular embodiments, architecture creator system 204 creates a relationship between the original, undisturbed reference data and the mirror copy used in the new project. Architecture creator system 204 may track how many times each reference data or architecture component is used in various projects.

In the illustrated embodiment, architecture creator system 200 includes a rules database 210. Rules database 210 may include a relational database or other data store that contains all or a portion of the business and technical rules necessary to support the validation of architecture components. Business and technical rules may be established based on user-created architectures and/or technical specifications that identify the compatibility of various architecture elements with one another. The content of rules database 210 provides a framework or standard guide for the creation of validated architectures. For example, during the creation of an architecture model, a user of client 202 may be prevented from inserting two architecture elements into a model when those architecture elements are incompatible and/or violate a business rule in rules database 210. As another example, geographic rules and placement diagrams may define where an architecture element should be deployed. Additionally, rules database system 210 may include templates for each architecture type.

Although the system 200 has been described in detail, it should be understood that various changes, substitutions and alterations can be made to system 200 without departing from the sphere and scope of the invention. System 200 may have more or less components (of these or differing types) without departing from the scope of the invention. For example, while system 200 is illustrated as including both a centralized repository 208 and a rules database 210, it is recognized that system 200 may include a single data store with the combined contents of centralized repository 208 and rules database 210. Alternatively, the contents of these data stores may be divided among any appropriate number of data stores.

Figure 3:
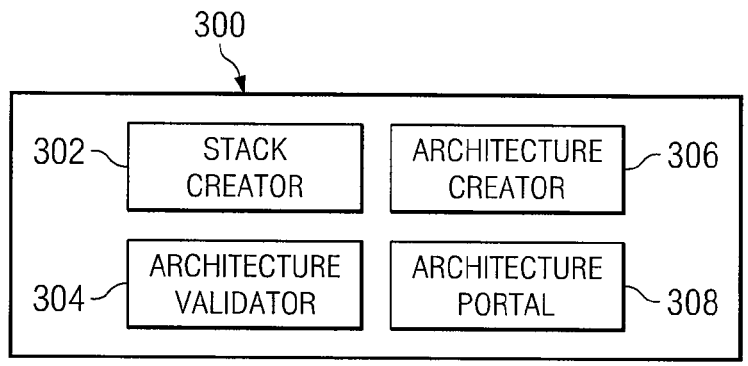
FIG. 3 illustrates a block diagram of an example architecture creator system in accordance with the present invention.

FIG. 3 illustrates a block diagram of an example architecture creator system 300. Architecture creator system 300 includes the hardware and software required to create architectures that include various combinations of architectural elements stored in a centralized repository, such as centralized repository 208. In particular embodiments, architecture creator system 300 may be configured substantially like computer 100 described above with regard to FIG. 1. Alternatively, architecture creator system 300 may include any general purpose computer with the appropriate applications and functionality for the creation, validation, retrieval, and analysis of architecture elements.

Stack Creator Tool

As described above, an architecture stack includes a predetermined and approved grouping of architecture elements. For creating architecture stacks, architecture creator system 300 includes a stack creator tool 302. Stack creator tool 302 may include any hardware and software that allows for the creation of software, hardware, and process objects that can be grouped together to create a custom architecture component.

Stack creator tool 302 enables users of clients 202 to build out logical groups of architecture components that are related to one another by a logical function. For example, stack creator tool 302 may provide a graphical user interface that enables a user of client 202 to create a stack and save a stack to the repository. Existing stacks that stored in centralized repository may be modified so as to add or delete components. Stacks may be created or modified to include an embedded stack within a stack.

During the creation of a stack, the graphical user interface may prompt a user to give the stack a unique filename. In particular embodiments, the filename may be required to conform to a naming standard such as the Agile Enterprise Reference Architecture (AERA) standards guide. Similarly, an existing stack may be renamed in compliance with any applicable naming standard.

To add items to a stack, stack creator tool 302 may present a list of components to the user. In particular embodiments, stack creator tool 302 may use technical rules in rules database 210 to limit the listing of components to only those items that are appropriate for the type of stack being built. Example stack types are discussed in more detail below. By limiting the listing of components in this manner, stack creator tool 302 ensures the integrity of the architecture produced. From the list of identified components, the user may then select items to be added to the stack. In particular embodiments, stack creator tool 302 may list the available components in a hierarchical format. The selection of a component from the hierarchical list may result in all subordinate components under the selected component being added to the stack.

After stacks have been created or updated, stack creator tool 302 allows the user to commit the stacks to centralized repository 208. In a particular embodiment, the number of stacks committed may be equal to the sum of the number of stacks and the number of architecture elements in each stack. This is because stack creator tool 302 commits architecture components to centralized repository 208 in their whole and individual forms. In addition to the architecture items being committed to centralized repository 208, stack creation tool 302 may result in relationships being committed. In particular embodiments, stack creator tool 302 may also include functionality allowing a user to submit a stack for review and validation.

In particular embodiments, stack creator tool 302 may include functionality for creating stacks of differing and distinct types. Stack creator tool 302 may also operate as an enforcer by using rules and technical policies in rules database 210 to limit the types of reference objects that go into each stack type. For example, in a particular embodiment, stack creator tool 302 supports three types of stacks: physical stacks, logical stacks, and process stacks. In such an example, stack creator tool 302 prevents the inappropriate inclusion of reference objects in the wrong type of stack. For example, stack creator tool 302 may prevent the placement of software products into a process stack.

A physical stack may depict the interface between structures, sub-assemblies, or assemblies and is used, specifically, to denote configurations for hardware or software. Software and hardware architectures may be created using stacks and then assigned to hardware to denote a specialized version of that hardware. Additionally, a single hardware item may have two stacks. A first stack for a hardware item may show the software required for the device. A second stack may indicate the hardware components such as disks, memory, or other components that identify the hardware item as a custom device.

Example items that may be included in a physical stack include hardware items such as hardware model products, software items such as software version products, and embedded physical stacks. Hardware items and software items are sets of hardware devices and software products, respectively, that are used in the construction of infrastructure architectures. Hardware items include devices such as servers, routers, mainframes, switches, remote devices, and other hardware components. Software items may include operating systems, support software, databases, web servers, application servers, and other software components. In a particular embodiment, the hardware items and software items may be loaded into centralized repository 208 based on a technology policy that may or may not be enterprise promulgated. Embedded physical stack items include a logical pre-defined grouping of hardware items and software items.

A logical stack is a logical grouping of a series of logical components. The grouping may describe a larger logical unit. As just one example, a major logical application could be comprised of several logical stacks that contain the supporting components such as asset discovery, database components, and user interface. Logical stacks may depict the interface between structures, sub-assemblies, or assemblies.

Example items that may be included in a logical stack include logical application items, logical architecture items, embedded logical stacks, and role items. Logical application items include representations of a physical application but describe a business function. A logical application item is more generic than a physical application. By contrast, logical architecture items include representations of functionality in a solution system that may translate into physical applications and software products. Logical role items describe the various user roles within an enterprise and denote the types of user that will utilize the resulting architecture. Embedded logical stack items include a logical pre-defined grouping of logical application items, logical architecture items, embedded logical stacks, and role items.

A process stack is a logical grouping of a series of process components such as processes or functions that define a logical grouping of processes for reuse by other architectures. A process stack is designed to allow for business processes, operational processes, and functional decomposition components to be grouped together into a logical set of processes to depict a larger function or process.

Example items that may be included in a process stack include business function items, business process items, operational process items, and embedded process stacks. A business function item includes a core set of business functions defined at an enterprise level that are leveraged in the architecture to demonstrate how the sub-assemblies and assemblies support key business functions. A business process item includes a suite of business processes that support the business functions. Relationships established between business processes and business functions facilitate the use of business process and business function items. An operational process item includes a lower level operational process that supports the business processes. Embedded process stack items include a logical pre-defined grouping of business function items, business process items, operational process items.

Architecture Validator

Once a stack is created, the stack should be reviewed, validated, and approved for production. Until approved for production, the status of a stack is "draft." Architecture creator system 300 includes an architecture validator 304 that enables the review and approval of draft stacks. Architecture validator tool 304 may include any hardware and software that allows for the validation and approval of architecture items and stacks of architecture items.

In a particular embodiment, architecture validator tool 304 may provide a graphical user interface that identifies stacks and/or architecture items that have been recently added to centralized repository 208 or that have been submitted for validation by a creator. Using the graphical user interface, architecture validator tool 304 may identify stacks to be validated to a formal review committee. The review committee may review the stack to ensure the compatibility of architecture components with other architecture sub-assemblies. Upon approving or validating a stack, a user may use architecture validator tool 304 to change the status of a stack from "draft" to "production."

Architecture creator system 300 also includes an architecture creator tool 306 that is used to create reference architectures including business, process, logical, and physical views. Architecture creator tool 306 include any hardware and software that allows for the creation of architecture sub-assemblies. In a particular embodiment, architecture creator tool 306 provides a graphical user interface that may be used by a user of client 202 to create an architectures comprised of logical combinations of architecture elements.

In particular embodiments, architecture creator tool 306 accesses rules database 210 to provide a user with a template for the creation of an architecture model or sub-assembly. Layers may be used to sub-divide a complete architecture into logical sub-groups. These sub-groups contain like components that service a particular function. The layering of architecture views of differing levels of abstraction allow architects to represent architecture from the highest level of abstraction down to the lowest level of detail. Example layers that may be included with in a template include: a physical hardware layer, a physical software layer, a logical applications layer, a logical components layer, an operational processes layer, a business processes layer, and a functional decomposition layer. Each layer will house the architecture components relating the particular subject of the layer. In particular embodiments, each layer may be stored in the repository as a whole and reused as a larger grouping within a model.

Before any layers or architecture elements can be added to a model, an identifier must be assigned to the model. The identifier comprises an anchor for all architecture elements created in the model. Stated differently, all elements in the architecture model or sub-assembly may be connected to the identifier and will be identified by the identifier in centralized repository 208 for reuse. Alternatively, where a user is working on an existing model, architecture creator tool 306 may provide a user with a list of architecture hierarchies at the highest level. A user can search for an existing architecture by the unique identifier assigned to that architecture.

Upon the user identifying a model, the layers associated with the model may be automatically imported from the repository and presented to the user. In particular embodiments, the architecture creator template offered by architecture creator tool 306 is limited to the scope of a single model. As described above, various layers of containers may be identified to the user. A user may select a particular layer or container and add an architecture element to the selected layer or container. In a particular embodiment, a list of architecture elements that are available to the user may be presented. Architecture creator tool 306 may access rules database 210 and offer a list that include only the types of architecture elements that are eligible for use in the environment associated with the selected layer. For the modification of models that are in progress, a user may also be given the option of deleting a selected architecture element.

In a particular embodiment, architecture creator tool 306 may allow a user to create a grouping of architecture design elements to be placed together logically. For example, a user may select a layer and then indicate that a grouping is to be created in the selected layer. Architecture elements may then be added to a grouping container. In particular embodiments, only the type of architecture elements that are eligible for use in the layer may be listed for a user. As a result, only the appropriate types of architecture elements may be grouped. Where desired, the grouping of architecture elements in the layer may be committed to centralized repository 208 for reuse by other users of clients 202.

In a similar manner, architecture creator tool 306 may allow a user to add pre-defined stacks of architecture elements to a model. For example, a user may select a layer and then indicate that a pre-defined stack is to be added to the selected layer. A listing of stacks may be displayed to the user for selection. In particular embodiments, only the type of stacks that are eligible for use in the particular layer may be listed for a user. As a result, only the appropriate types of stacks may be selected by a user.

Once the architecture elements for a model are identified, architecture creator tool 306 allows a user to format the model. Architecture creator tool 306 may present various graphical user interface commands that allow a user to reposition, scale up, scale down, change the alignment, and resize architecture elements. Architecture creator tool 306 may also allow a user to select the size, style, and color of text. The color of an architecture element or a grouping of like architecture elements may be selected. Where predefined shapes are used for hardware elements, architecture creator tool 306 may allow a user to change the shape of such elements.

Architecture creator tool 306 may also allow a user to create various links or relationships between architecture elements and between a model and various external specifications. For example, in a particular embodiment, a user may use architecture creator tool 306 may be used to link a document library to a model. A document library is an identifier of a data store that includes the documents that comprise an architecture. For example, in a particular embodiment, the identifier may include a uniform resource locator identifying the location of a web site library that is populated into centralized repository 208.

Architecture creator tool 306 may also be used to tie each element of an architecture to a release for which it is being developed. Connecting elements to the appropriate release allows users to easily identify which elements with the architecture creator system belong to which release. Elements that do not apply to a release may be grayed out. The features allows for the generation of a report to illustrate all architecture components that are associated with a particular release. It may be desirable at some point to disconnect an architecture element from a release. Accordingly, architecture creator tool 306 may provide additional functionality by which a user can disconnect one or more architecture elements from a user-specified release.

In particular embodiments, architecture creator tool 306 may also allow a user to create a relationship between architecture elements in a model. The relationship between the architecture elements may include a primary relationship or a secondary relationship, and in some instances it may be desirable to create multiple relationships between two architecture elements. Example primary relationships include identifying that one architecture element needs another architecture element, that one architecture element has a corequisite, or that one architecture element has a prerequisite. A relationship between two architecture elements may be depicted in the final model as a line connecting the two.

Where multiple relationships between architecture elements are created, multiple, differing lines may connect the two architecture elements. Architecture creator tool 306 may provide the user with formatting options for the relationships created between the architecture elements. Such formatting options may include line style, line color, line type, and line size. Where a particular data flow direction is desired, the user may select an indicator for identifying in the model the direction in which data should flow between the architecture elements. A traffic type may be selected where the traffic between two architecture elements is limited to a specific type of traffic. Still another formatting option may include they type of data flow protocol connecting the two elements, such as http, ftp, UDP, or another suitable protocol. In a particular embodiment, a user may specify a port number of the target architecture element to which data is transmitted. A user may also specify the type of information flowing between the architecture elements. Additionally or alternatively, a user may create a label that allows a data flow direction and purpose assigned to the relationship to be depicted on the resulting model. Architecture creator tool 306 may also allow a user to add comments to an architecture. A user may identify a particular layer or architecture element and create text that will be displayed in the architecture.

In particular embodiments, architecture creator tool 306 may also allow a user to link a model with one or more business components, business rules, or technical requirement. Links to technical requirements may provide an explicit linkage between the requirements for the particular model and the model fulfilling those requirements. In particular embodiments, architecture creator tool 306 may present a user with a list of business or technical requirement linkage types, and the user may select the desired link. For example, a standardized list of available links may be provided to the user. In response to user selection of a desired link, architecture creator tool 306 may create an object link between the model and the selected link. Links to business rules and components show the value of the created model to the related business and may be useful in the generation of reports through an architecture reporter tool 308 that will be described in more detail below.

In particular embodiments, architecture creator tool 306 may allow for the creation of integration stacks to provide a bridge between architecture components in different architecture models. An integration stack is a specialized stack that contains components that tie together large parts of other architectures. Integration stacks contain interface components that have key information to formulate technology rules and policies. Integration stacks may be used in solution based architectures to tie together different architectures and to describe the flow between the components of each assembly. Example items that may be allowed into an integration stack, in a particular embodiment, may include enterprise-specific software applications, hardware products, software products, logical applications, logical architecture items, and embedded integration stacks.

For creating a bridge between two models, architecture creator tool 306 may create a public interface between two or more architectures. The public interface is distinguishable from a private interface that may refer to the interaction points between two components within a single architecture model. The public interface instead refers to the interaction points between two architecture models. The public interfaces allow user to define two-related architectures in the context of a "service" that can be consumed by other users.

An integration stack may be created as an architecture is being built. As such, in a particular embodiment, an integration stack may be created by architecture creator tool 306 rather than by stack creator tool 302. The process for creating an integration stack may be similar, however, to the process of creating a stack using stack creator tool 302. For example, architecture creator tool 306 may allow a user to identify where an integration stack will be placed and then insert the appropriate type of integration stack into the architecture. Architecture creator tool 306 may allow a user to name the integration stack, add descriptions about the stack, and add architecture elements to the stack. Like stack creator tool 302, described above, architecture creator tool 306 may limit a user's choices such that only architecture elements of the correct type may be provided as choices for the user to select when adding architecture elements to an integration stack.

Each integration stack provides key components needed to communicate with the adjoining architecture component. The key to integrating the stack interfaces is the relationships between the adjoined integration stacks. The relationships carry a series of properties which contain information to link together the components. In a particular embodiment, a special element may be used to bring in a representation of the external architecture and provide the connection into the key components of the integration stacks from that architecture.

Architecture models created using architecture creator system 300 are meant to be used as components of larger architectures. Architecture creator tool 306 allows this to be done through architecture reuse. Specifically, architecture creator tool 306 assigns a URL field to each architecture element. Each URL field is populated with the location of the model file. In a particular embodiment, different folders may be maintained and may describe the status or progress of a model. For example, a model may be saved in a work-in-progress folder while the model is under construction. Conversely, the model may be stored in a staging folder when the model is complete but is awaiting review. Models that are completed and have been reviewed and approved may be stored in a published folder that is available for production use.

A user portal 308 provides the ability for the user to look at details of individual architecture components stored in centralized repository 208 that are used for reference in the design of new systems. User portal 308 includes a query system that enables a user to look view architecture elements organized by type. For example, a user can review a list of all components of that meet the requirements of the query. User portal 308 may enable a user to view a specific set of architecture elements and relationships stored in centralized repository 208. In particular embodiments, a hierarchical tree structure may be used to display architecture elements. Various trees and sub-trees may be selected to refine a search for a particular architecture element. Additionally or alternatively, a search system may allow a user to submit text-based searches. In response to the text-based query, user portal 308 may present a subset of items with a similar name or string.

User portal 308 includes a reporting system that provides standard and custom reports about the reference data stored in centralized repository 208 as well as stored architectures to determine areas as compliance and accuracy. A number of standard reports may be available. Additionally, portal 308 may includes features that allow a user to generate custom reports that support the individual needs of users of clients 202. Reports generated by user portal 308 may include, in particular embodiments, column reports, bar charts, pie graphs, dial gauges, Gantt charts, and the like. Reports may be available in a variety of user-selectable formats. For example, in a particular embodiment, the user may select that a report be output in HTML format, PDF format, or Excel. Additionally or alternatively, reports may be exported into presentations, where desired.

In particular embodiments, the components of architecture creator system 300 cooperate to enable multiple users to work on a single architecture in a collaborative environment. For example, when an architect has finished working on a portion of the architecture, the architect commits the architecture to the repository. Once committed, the architecture is available to other architects. Such an architect may retrieve the portion of the architecture from the repository and continue working on the portion. To prevent changes to a previous user's work, subsequent users may create working copies of the architecture and make changes to that copy. Additionally or alternatively, a user may retrieve an architecture and save it in an empty template before making modifications. When the user is finished, the architect again commits the portion to the repository.

To ensure that two users are not working on the same design at the same time, architecture creator system 300 may provide a check-in/check-out system that requires a user to check out an architecture before the user can work on it. Once checked out, the architecture is unavailable to other architects until it is checked back in.

Figure 4:
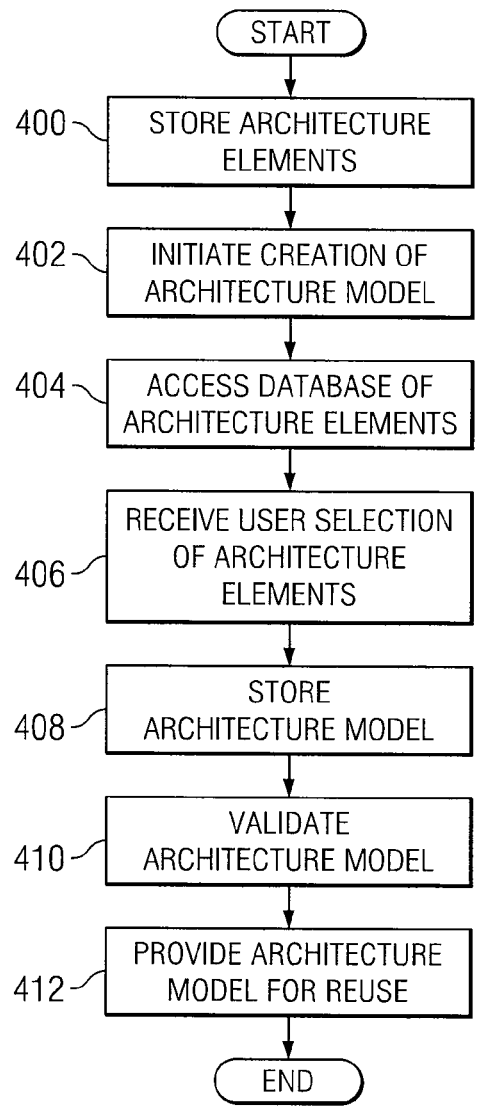
FIG. 4 illustrates a flow chart describing an example method for the electronic design of collaborative and validated architectures in accordance with the present invention.

FIG. 4 illustrates a flow chart describing an example method for the electronic design of collaborative and validated architectures in accordance with the present invention. The method described herein may be carried out using computer software, as can any or all of the processes described herein. That software may be executed by computer 10, architecture creator system 204, or any other computer or combination of computers.

In a particular embodiment, the method initiates at step 400, where a plurality of architecture elements created by a plurality of users are stored in a centralized database 208. Some of the architecture elements may include logical groupings of architecture elements that are related to one another by a logical function. These related architecture elements may be stored in centralized database as an integrated architecture stack, in a particular embodiment. Each architecture element in an architecture stack may have a dependence upon or relationship with at least one other architecture element in the same architecture stack. In a particular embodiment, an architecture stack may include an embedded architecture stack that is comprised of a logical sub-grouping of architecture elements.

At step 402, the creation of a first architecture model is initiated in response to a request of a first user of a first client system 202. In a particular embodiment, initiating the creation of the first architecture model may include presenting a template to the user. Additionally or alternatively, a plurality of layers or other containers may be presented to the user. Each layer or container may be configured to include a logical sub-group of architecture elements selected by the user. In a particular embodiment, a selection by a user of a particular layer may be received, and a listing of architecture elements that are suitable for inclusion in the layer may be presented to the user.

At step 404, centralized database 208 is accessed to retrieve architecture elements for inclusion in the architecture model. The architecture elements or a subset thereof may be presented to a user for inclusion in the architecture model. In a particular embodiment, the a filter may be applied to the architecture elements in centralized database 208. For example, the architecture elements may be filtered based on a type of the first architecture model. Where a filter is applied, only the architecture elements that are suitable for the particular architecture model may be presented.

At step 406, a selection of at least one architecture element may be received from a user. In a particular embodiment, the selection may identify individual architecture elements for inclusion in the architecture model. Additionally or alternatively, the selection may include the selection of an architecture stack. In a particular embodiment, the selection may include the selection of a grouping of architecture elements.

At step 408, the architecture model and the architecture elements making up the architecture model may be stored in the centralized database. In a particular embodiment, in addition to storing the architecture model as a whole, the architecture elements that make up the architecture model may be stored individually. In a particular embodiment where a grouping of architecture elements has been created, the grouping may be stored as an architecture stack. Where validation of the architecture model is desired, the status of the architecture model may indicate it as a draft model.

At step 410, the architecture model created by the user may be validated. For example, an architecture creator system 204 may automatically determine if the first architecture model and the architecture elements making up the architecture model are compliant with one or more technical or business rules. The architecture model may be validated if the architecture model and its component parts are compliant with the one or more technical or business rules. Additionally or alternatively, the architecture model may be accessed by a review committee who may determine if the architecture model and its component parts are compliant with the one or more technical or business rules. Upon the validation of the architecture model, the status of the architecture model as stored in the centralized database may be changed from "draft" to "production."

At step 412, the architecture model as stored in centralized database 208 may be available for reuse by other users of architecture creator system 204. Accordingly, in a particular embodiment, a subsequent user of architecture creator system 204 may access the stored architecture model. The subsequent user may then modify the architecture model where a collaboration is desired among multiple architects. Alternatively, the subsequent user may copy the architecture model and begin altering the architecture model for the creation of an entirely new architecture model. In a particular embodiment, where a subsequent user seeks to alter an architecture model that is stored in centralized database 208, a mirror copy of the architecture model may be created. The subsequent user may then modify the mirror copy of the architecture model such that the original copy of the architecture model remains unchanged.

Although the present invention has been described in detail, it should be understood that various changes, substitutions and alterations can be made hereto without departing from the sphere and scope of the invention as defined by the appended claims. For example, the steps described with regard to FIG. 4 are merely provided as example methods for performing the functionality described. It is recognized that the methods may be performed using any combination of the steps described together with any other appropriate steps safeguarding confidential information. Furthermore, it is recognized that the steps may be performed in any order without departing from the intended scope of the invention.

For example, in a particular embodiment an additional step that may be performed may include linking the architecture model or one or more elements within the architecture model with one or more stored business rules or technical requirements. Additionally or alternatively, the architecture model or its one or more architecture elements may be linked with a second architecture model. Finally, additional steps may be performed for the generation of custom or standard reports. Such reports may include information about the architecture elements in the first architecture model and one or more business or technical rules applicable to the first architecture model.

Additionally, the embodiments illustrated in FIGS. 1, 2, and 3 merely represent example configurations for the components of systems 100, 200, and 300, respectively. It is recognized that many modifications to these systems may be made without departing from the intended scope of the invention.

To aid the Patent Office, and any readers of any patent issued on this application in interpreting the claims appended hereto, applicants wish to note that they do not intend any of the appended claims to invoke ¶6 of 35 U.S.C. § 112 as it exists on the date of filing hereof unless "means for" or "step for" are used in the particular claim.

What is claimed is:

1. A method for electronic design of an architecture, comprising:
    storing a plurality of architecture elements created by a plurality of users in a centralized database;
    initiating creation of a first architecture model in response to a request of a first user of a first client system;
    accessing, by at least one computer, the centralized database to retrieve the plurality of architecture elements and a plurality of architecture stacks that include a physical stack having a hardware element and a software element, and a process stack that includes a grouping of processes;
    receiving, by the at least one computer, a selection from the first user of at least one architecture element and at least one of the architecture stacks for inclusion in the first architecture model; and
    storing, by the at least one computer, the first architecture model comprising the at least one selected architecture element and the at least one architecture stack in the centralized database.

2. The method of claim 1, wherein initiating the creation of the first architecture model comprises presenting a template to the first user.

3. The method of claim 1, wherein initiating the creation of the first architecture model comprises presenting a plurality of layers to the first user, each layer comprising a logical sub-group of architecture elements selected by the first user.

4. The method of claim 3, further comprising:
    receiving a user selection of a selected one of the plurality of layers; and
    presenting, to the first user, a listing of architecture elements that are suitable for inclusion in the selected one of the plurality of layers.

5. The method of claim 1, wherein storing the first architecture model in the centralized database comprises:
    storing the first architecture model as a whole; and
    storing the architecture elements making up the first architecture model individually.

6. The method of claim 1, wherein each of the architecture stacks comprises a logical grouping of architecture elements related to one another by a logical function.

7. The method of claim 6, wherein each architecture element in an architecture stack is dependent on at least one other architecture element in the architecture stack.

8. The method of claim 6, wherein at least one of the plurality of architecture stacks includes an embedded architecture stack, the embedded architecture stack comprising a logical sub-grouping of architecture elements.

9. The method of claim 1, further comprising:
at the request of a second user, accessing the first architecture model stored in the centralized database; and
allowing the second user to modify the first architecture model.

10. The method of claim 1, further comprising:
at the request of a second user, accessing the first architecture model stored in the centralized database;
creating a mirror copy of the first architecture model; and
allowing the second user to modify the mirror copy of the first architecture model.

11. The method of claim 1, further comprising:
receiving selection of a grouping of architecture elements from the first user; and
saving the grouping of architecture elements as one of the architecture stacks in the centralized database.

12. The method of claim 1, further comprising:
determining if the first architecture model is compliant with one or more technical rules; and
validating the first architecture model if the first architecture model is compliant with the one or more technical rules.

13. The method of claim 1, wherein storing the first architecture model in the centralized database comprises:
storing the first architecture model with a status identifying the first architecture model as a draft;
receiving approval of the first architecture model from a reviewer; and
changing the status of the first architecture model to a production status.

14. The method of claim 1, wherein after accessing the centralized database to retrieve the plurality of architecture elements, the method further comprises:
filtering the plurality of architectural elements based on a type of the first architecture model; and
presenting, based on the filtering, only the architectural elements that are suitable for the type of the first architecture model.

15. The method of claim 1, further comprising linking the first architecture model with one or more stored business rules or technical requirements.

16. The method of claim 1, further comprising linking the first architecture model with a second architecture model.

17. The method of claim 16, wherein the linking is performed by providing an integration stack bridging the first and second architecture models, where the integration stack contains components that tie together parts of the first and second architecture models.

18. The method of claim 1, wherein the architecture stacks further include a logical stack that includes a grouping of logical components.

19. A system for electronic design of collaborative and validated architectures, comprising:
a centralized database storing a plurality of architecture elements created by a plurality of users;
a network to couple the centralized database to a plurality of client systems; and
an architecture creator system including a computer and coupled to the network and operable to access the centralized database via the network, the architecture creator system to:
initiate creation of a first architecture model in response to a request of a first user of a first client system;
access the centralized database to retrieve the plurality of architecture elements and a plurality of architecture stacks that include a physical stack having a hardware element and a software element, and a process stack that includes a grouping of processes;
receive a selection from the first user of at least one architecture element and at least one of the architectural stacks for inclusion in the first architecture model; and
store the first architecture model comprising the at least one selected architecture element and the at least one architectural stack in the centralized database.

20. The system of claim 19, wherein the architecture creator system is to initiate the creation of the first architecture model by presenting a template to the first user.

21. The system of claim 19, wherein the architecture creator system is to initiate the creation of the first architecture model by presenting a plurality of layers to the first user, each layer comprising a logical sub-group of architecture elements selected by the first user.

22. The system of claim 21, wherein the architecture creator system is to:
receive a user selection of a selected one of the plurality of layers; and
present, to the first user, a listing of architecture elements that are suitable for inclusion in the selected one of the plurality of layers.

23. The system of claim 19, wherein when storing the first architecture model in the centralized database, the architecture creator system is to:
store the first architecture model as a whole; and
store the architecture elements making up the first architecture model individually.

24. The system of claim 19, wherein each of the architecture stacks comprises a logical grouping of architecture elements related to one another by a logical function.

25. The system of claim 24, wherein each architecture element in an architecture stack is dependent on at least one other architecture element in the architecture stack.

26. The system of claim 24, wherein at least one of the plurality of architecture stacks includes an embedded architecture stack, the embedded architecture stack comprising a logical sub-grouping of architecture elements.

27. The system of claim 19, wherein the architecture creator system is further to:
at the request of a second user, access the first architecture model stored in the centralized database; and
allow the second user to modify the first architecture model.

28. The system of claim 27, wherein the architecture creator system is further to:
at the request of a second user, access the first architecture model stored in the centralized database;
create a minor copy of the first architecture model; and
allow the second user to modify the mirror copy of the first architecture model.

29. The system of claim 27, wherein the architecture creator system is further to:
receive selection of a grouping of architecture elements from the first user; and
save the grouping of architecture elements as one of the architecture stacks in the centralized database.

30. The system of claim 19, wherein the architecture creator system is further to:
determine if the first architecture model is compliant with one or more technical rules; and validate the first architecture model if the first architecture model is compliant with the one or more technical rules.

31. The system of claim 19, wherein when storing the first architecture model in the centralized database, the architecture creator system is to store the first architecture model with a status identifying the first architecture model as a draft, the architecture creator system further to:

receive approval of the first architecture model from a reviewer; and change the status of the first architecture model to a production status.

32. The system of claim 19, wherein after accessing the centralized database to retrieve the plurality of architecture elements, the architecture creator system is further to:

filter the plurality of architectural elements based on a type of the first architecture model; and present, based on the filtering, only the architectural elements that are suitable for the type of the first architecture model.

33. The system of claim 19, wherein the architecture creator system is further to link the first architecture model with one or more stored business rules or technical requirements.

34. The system of claim 19, wherein the architecture creator system is further to link the first architecture model with a second architecture model.

35. The system of claim 34, wherein the linking is performed by providing an integration stack bridging the first and second architecture models, where the integration stack contains components that tie together parts of the first and second architecture models.

36. The system of claim 19, wherein the architecture stacks further include a logical stack that includes a grouping of logical components.

* * * * *